(12) United States Patent
Sen et al.

(10) Patent No.: US 7,924,739 B2
(45) Date of Patent: Apr. 12, 2011

(54) METHOD AND APPARATUS FOR ONE-WAY PASSIVE LOSS MEASUREMENTS USING SAMPLED FLOW STATISTICS

(75) Inventors: Subhabrata Sen, New Providence, NJ (US); Lee Breslau, Basking Ridge, NJ (US); Nicholas Duffield, Summit, NJ (US); Yu Gu, Plainsboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 171 days.

(21) Appl. No.: 12/317,420

(22) Filed: Dec. 22, 2008

(65) Prior Publication Data

US 2010/0157840 A1    Jun. 24, 2010

(51) Int. Cl.
H04J 3/14 (2006.01)
H04L 12/26 (2006.01)
G06F 11/30 (2006.01)

(52) U.S. Cl. .................................... 370/253; 709/224

(58) Field of Classification Search .............. 370/241, 370/252, 253, 389, 229, 231, 236; 709/224
See application file for complete search history.

(56) References Cited

U.S. PATENT DOCUMENTS

| | | | |
|---|---|---|---|
| 6,912,216 B1 | 6/2005 | Smith et al. | |
| 7,120,931 B1 | 10/2006 | Cherlton | |
| 2003/0107990 A1* | 6/2003 | Herschleb et al. | 370/229 |
| 2004/0105391 A1* | 6/2004 | Charcranoon | 370/252 |
| 2004/0208128 A1* | 10/2004 | Lu et al. | 370/238 |
| 2007/0268882 A1 | 11/2007 | Breslau et al. | |

OTHER PUBLICATIONS

Standardized Active Measurements on a Tier 1 IP Backbone; Leonard Ciavattone, et al.; IEEE Communications Magazine; Jun. 2003; pp. 90-97.

Trajectory Sampling for Direct Traffic Observation; N. G. Duffield, et al.; AT&T Labs Research; pp. 1-14; undated.

Deployment of Sampling Methods for SLA Validation With Non-Intrusive Measurements; Tanja Zseby, FOKUS—Fraunhofer Institute for Open Communication Systems; Kaiserin-Augusta-Allee 31, 105 Berlin, Germany; undated.

* cited by examiner

Primary Examiner — Min Jung
(74) Attorney, Agent, or Firm — Hanley, Flight & Zimmerman, LLC (57) ABSTRACT

A packet loss estimation technique is disclosed that utilizes the sampled flow level statistics that are routinely collected in operational networks, thereby obviating the need for any new router features or measurement infrastructure. The technique is specifically designed to handle the challenges of sampled flow-level aggregation such as information loss resulting from packet sampling, and generally comprises: receiving a first record of sampled packets for a flow from a first network element; receiving a second record of sampled packets for the flow from a second network element communicating with the first network element; correlating sampled packets from the flow at the first network element and the second network element to a measurement interval; and estimating the packet loss using a count of the sampled packets correlated to the measurement interval.

20 Claims, 8 Drawing Sheets

| TRACE | DATE | LINK SPEED | DURATION | DATA RATE | PACKET RATE | SYN/FIN RATE |
|---|---|---|---|---|---|---|
| DATA CENTER | 2006, SEPT. 17th | GigEth | 1 hour | 400 Mbps | 61367 pkts/s | 1781 pkts/s |
| ABILENE-I | 2002, AUG. 14th | OC-48 | 20 min | 400 Mbps | 64136 pkts/s | 1015 pkts/s |
| ABILBENE-III | 2004, JUN. 1st | OC-192 | 30 min | 500 Mbps | 89889 pkts/s | 4968 pkts/s |

TRACE INFORMATION

FIG. 4b

| PARAMETERS | RANGE |
|---|---|
| PACKET LOSS RATE | 0.001, 0.005, 0.01, 0.05, 0.1 |
| SAMPLING RATE | 1, 1/50, 1/500 |
| TIME OUT (ACTIVE, INACTIVE) | T1=(60s, 15s), T2=(5min, 30s), T3=(30min, 60s) |
| MEAS. INTERVAL | 1min, 5min, 15min |

EVALUATION SETTINGS

FIG. 5

FIG. 6a (a) Abilene-I, Sampling rate 1/50

FIG. 6b (b) Abilene-I, Sampling rate 1/500

FIG. 7a

Abilene-III, FITTED FLOWS BASED METHOD

FIG. 7b

Abilene-III, WEIGHTED FLOWS BASED METHOD

FIG. 9

METHOD AND APPARATUS FOR ONE-WAY PASSIVE LOSS MEASUREMENTS USING SAMPLED FLOW STATISTICS

FIELD OF THE INVENTION

The present invention relates generally to networking, and more particularly, to devices, systems and methods to improve network monitoring in packet networks by accurately and scalably measuring one-way packet loss between network elements using sampled flow level statistics that are routinely collected by commonly implemented features on the network elements. By exploiting these features, a loss estimation technique is presented that avoids the need to deploy any new special purpose router features or measurement infrastructure.

BACKGROUND OF THE INVENTION

IP networks today support a range of business-critical applications, and network performance problems can have serious adverse business consequences and revenue losses such as Service Level Agreement (SLA) violations for the service provider, and outages and business service disruptions for the customer. The ability to proactively monitor a network's health is therefore vital to critical network management functions such as problem detection, troubleshooting, and SLA compliance monitoring.

Network traffic management includes the ability to accurately and scalably measure the one-way packet loss experienced by traffic along a specific path between routers in a network. Existing measurement methods include both passive and active techniques. In currently deployed passive methods, specialized and highly expensive high-speed traffic monitors are deployed at network elements along a path of interest. The network elements compile reports on the packets, either individually or in aggregate. These reports are stored either at the network element for subsequent retrieval by the network management system via Simple Network Management Protocol (SNMP), or are communicated to a collector as exemplified by NetFlow, the latter which is used to routinely perform baseline loss measurements across network paths with no modification to its deployment. NetFlow is a network protocol developed by Cisco Systems to run on Cisco IOS-enabled equipment for collecting IP traffic information.

Currently, there are four basic approaches that are utilized for measuring one-way packet loss in a packet network. In the first, the SNMP that is used to access and/or exchange management information between network devices is employed with Interface Counters to ubiquitously report aggregate packet drop count from router queues. This expedient has several drawbacks including losses not specific to an interface that are not reported, limited temporal granularity due to the SNMP polling frequency (commonly several minutes), and unsynchronized polling intervals across routers, thereby making it difficult to compose link losses along a path.

In active measurement, probe packets are introduced into the network by a special purpose measuring device and these are dispatched to one or more destination network elements. Active performance measurements between host pairs can be used to directly measure packet loss rate, such as described in "Standardized active measurements on a tier 1 IP backbone," *IEEE Communications Magazine*, May 2003 by L. Ciavattone, A. Morton, and G. Ramachandran. Coverage is limited to paths joining the deployed measurement hosts. In addition, the use of special purpose measuring devices can incur significant equipment, management and administrative costs. Other active measurement techniques include single host-based approaches such as ping to report round trip loss, and packet train-based methods such as pathchar (see A. B. Downey, "Using pathchar to estimate Internet link characteristics," *SIGCOMM,* 1999). The latter requires high measurement bandwidth and loses resolution on higher speed links.

Another known approach is referred to as Network Performance Tomography, which shares many of the general properties of active measurement, but infers performance on component links by correlating measurements on intersecting paths through the network. See, A. Adams, T. Bu, R. Cáceres, N. Duffield, T. Friedman, J. Horowitz, F. L. Presti, S. Moon, V. Paxson, and D. Towsley, "The use of end-to-end multicast measurements for characterizing internal network behavior," *IEEE Communications Magazine*, May 2000. Correlated measurement generally requires finer resolution and more complexity in the measurement infrastructure, e.g. the ability for measurement endpoints to report observations on small groups of packets or even. individual packets.

Passive Measurement employs observations of a traffic flow at two measurement points to infer performance of the intervening path. For example, trajectory sampling as outlined in N. Duffield and M. Grossglauser, "Trajectory sampling for direct traffic observation," *IEEE/ACM Transactions on Networking*, vol. 9, no. 3, pp. 280-292, June 2001, correlates sampling of traffic at different locations, with routers sampling packets only if a hash calculated over packet field that does not change in transit falls within a given set. See also T. Zseby, "Deployment of sampling methods for SLA validation with non-intrusive measurements," *Proceedings of Passive and Active Measurement Workshop (PAM)*, 2002. Hash-based selection is being standardized, but is not currently available as a standard router feature.

It would therefore be advantageous to provide improved network measurement techniques which enable accurate and scalable measuring of the one-way packet loss experienced by traffic along a specific path between routers in a provider network, without the need to deploy specialized equipment in the network. The existing router features and measurement infrastructure can be exploited to provide a loss estimation technique using routinely collected sampled flow level statistics. To the inventors' knowledge, no such system or method currently exists.

SUMMARY OF THE INVENTION

In accordance with aspects of the present invention, a packet loss estimation technique is provided that utilizes the sampled flow level statistics that are routinely collected in operational networks, thereby obviating the need for any new router features or measurement infrastructure. The technique is specifically designed to handle the challenges of sampled flow-level aggregation such as information loss resulting from packet sampling.

In accordance with aspects of the present invention, a method for measuring one-way packet loss in a packet network, comprises: receiving a first record of sampled packets for a flow from a first network element; receiving a second record of sampled packets for the flow from a second network element communicating with the first network element; correlating sampled packets from the flow at the first network element and the second network element to a measurement interval; and estimating packet loss using a count of the sampled packets correlated to the measurement interval.

The estimated packet loss is represented by:

$$\hat{p} = 1 - \frac{X_2/s}{X_1/s} = 1 - \frac{X_2}{X_1},$$

wherein, $X_1$ and $X_2$ equal the count of sampled packets from the first and second network elements, respectively, with a packet sampling rate s during the measurement interval defined as $(t_1, t_2)$.

In accordance with a first technique referred to as "SYN/FIN," the method comprises correlating sampled packets from the flow to the measurement interval $(t_1, t_2)$ by: setting the flow start time in each record to the arrival time of a SYN packet; setting the flow end time in each record for to the arrival time of a FIN packet; and if the flow start time is within the measurement interval $(t_1, t_2)$, then attributing the SYN packet to the packet count for the network element that generated the record; and if the flow end time is within the measurement interval $(t_1, t_2)$, then attributing the FIN packet to the packet count for the network element that generated the record.

In accordance with a second technique referred to as "fitted-flows", the method comprises correlating sampled packets from the flow to the measurement interval $(t_1, t_2)$ by: for the flow (F), setting $R_F^1$ as a set of records generated by the flow F at the first network element $R_1$ and $R_F^2$ as a set of records generated by the flow F at the second network element $R_2$; for all flow records $R \in R_F^1 \cup R_F^2$, where the starting time $t_s$ and end time $t_e$ recorded in R either fall within the measurement interval $t_1 < t_s < t_e < t_2$, or outside the interval $t_s < t_e < t_1$ or $t_2 < t_s < t_e$; and calculating the sampled packet counts $X_1$ and $X_2$ as the sum of SYN packets, FIN packets and a total number of packets reported in the flow records which fall entirely within the measurement interval $(t_1, t_2)$.

In accordance with a third technique referred to as "weighted-flows", the method comprises correlating sampled packets from the flow to the measurement interval $(t_1, t_2)$ by: denoting $t_R^s$ as the flow start time recorded in a record R and $t_R^e$ as the flow end time recorded in a record R; setting the duration of the record $d_R = t_R^e - t_R^s$, and the duration of overlap of $(t_R^s, t_R^e)$ and the measurement interval $(t_1, t_2) = o_R$, then:

$$X_1 = \sum_{R \in R_1} \frac{o_R}{d_R} n_R, \quad X_2 = \sum_{R \in R_2} \frac{o_R}{d_R} n_R,$$

where $R_1$ is the record generated at the first network element, $R_2$ is the record generated at the second network element, and $n_R$ is the number of packets reported in record R.

In accordance with yet another aspect of the invention, there is provided a machine-readable medium containing computer encoded instructions which when executed by a processor, enable a device to estimate one-way packet loss in a packet network by executing the methodologies described above.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

In accordance with aspects of the present invention, a scalable light weight one-way loss estimation technique is disclosed that employs the sampled flow level statistics exported by routinely configured routers in today's operational networks. The estimation utilizes the existing deployed network infrastructure to estimate one-way path loss, and does not require the use of new router features or a separate measurement infrastructure. The technique described herein specifically addresses information attributable to flow records that are based on a sampled subset of the packets and the flow aggregation that obscures packet-timing information.

Evaluations using real traces collected at different vantage points indicate that the technique can accurately estimate the loss rate with low variability. In simulation experiments a 1% packet loss rate over a one minute period was able to be discerned even under a packet sampling rate of 1/500 from a stream of 0.5 Gb/sec. When comparing the performance of the present invention to that of an equivalent active measurement packet stream, for the problem just described, the equivalent is about one probe packet per second. Longer measurement periods reduce the error while a relative standard deviation of about 1.0 decreases to about 0.25 as the measurement period increases to 15 minutes. The absolute error remains the same if the target loss rate increases to 5%. This reflects a result from analysis that the absolute error is largely independent of loss rate if the loss rate is small, while decreasing as the square root of the number of probes.

Figure 1:
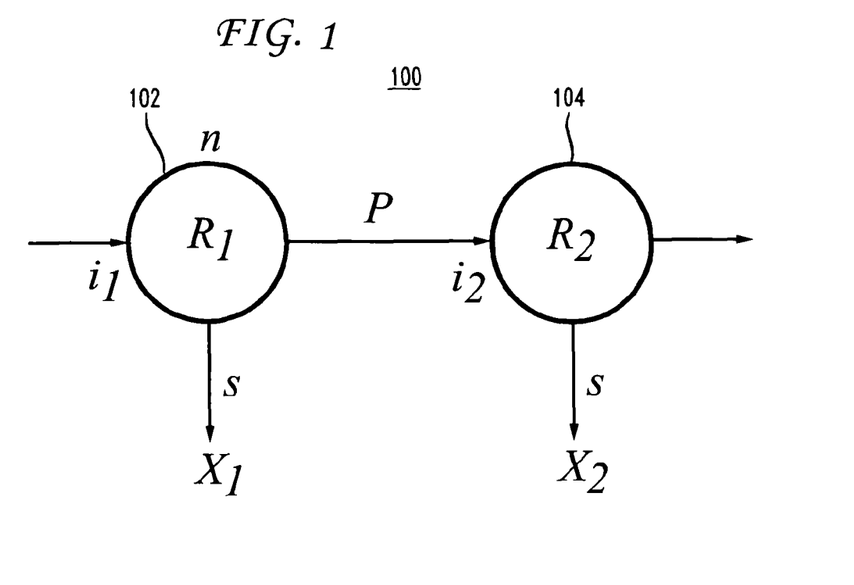
FIG. 1 is a schematic of an estimation model in accordance with an aspect of the present invention.

With reference to FIG. 1, there is depicted a schematic of an exemplary network comprising a first network element 102 (router $R_1$) and a second network element 104 (router $R_2$) that are on a path P in the network. Packets traversing path P will first arrive at interface $i_1$ on $R_1$ and then arrive at interface $i_2$ on $R_2$. Between $i_1$ and $i_2$, packets are subject to a loss with rate p. It is assumed that $i_1$ and $i_2$ can export flow statistics compiled from a substream of packets n that have been independently sampled at each router with the same sampling rate s. The analysis may be extended simply to the case of unequal sampling rates. During a specified time interval $(t_1, t_2)$, the use of flow level statistics will be used to infer the packet loss rate P.

In the flow paradigm exemplified by NetFlow, routers export flow records that summarize groups of packets with a distinguishing common property, known as the key, that are observed within a period of time. The distinguishing flow key is commonly built out of the packet header, i.e., protocol, source and destination IP address and TCP/UDP ports. Flows are terminated, i.e., the summaries are closed out and exported, when any one of a number of conditions occurs, including (i) inactive timeout (time since a flow's previous packet exceeds a threshold) (ii) active timeout (time since a flow's first packet exceeds a threshold) (iii) protocol events (e.g. TCP FIN flag observed) or (iv) cache flushing. The flow records report the flow key, total bytes and packets, time of first and last observed packets, and TCP flags over all observed packets.

In the flow paradigm, resource constraints usually necessitate sampling a packet stream at a router prior to the formation of flow statistics. NetFlow sampling is either "periodic" (i.e., every $N^{th}$ packet is sampled), or "stratified" (i.e., one packet at random from each group of N successive packets is sampled). Another sampling application known in the art is sFlow®, which reports on single packets that have been sampled independently. SFlow resembles NetFlow as configured with a zero inactive timeout. The choice of sampling discipline is relatively unimportant when considering packet average quantities such as loss rate, and aspects of the present invention model sampling as independent between packets, even when analyzing NetFlow.

As shown in FIG. 1, it is understood that packet loss is independent (Bernoulli) at rate p. For a set of n packets that traverse $R_1$ and $R_2$ during time interval $(t_1, t_2)$, $X_1$ and $X_2$ are counts of packets sampled at packet sampling rate s by $R_1$ and $R_2$, respectively, from the set n. $X_i/s$ are unbiased estimators of the actual number of packets traversing $R_i$, therefore p can be estimated by $$\hat{p} = 1 - \frac{X_2/s}{X_1/s} = 1 - \frac{X_2}{X_1} \quad (1)$$

Under the Bernoulli loss model it follows from the Strong Law of Large Numbers that $\hat{p}$ converges almost surely top as the number of underlying packets n grows.

Concerning the effects of possible departures from the Bernoulli model: (i) when loss rates are time varying, the estimator reflects average loss over the measurement interval; and (ii) correlated losses will increase estimator variance to some degree, but the expected impact can be small if congestion timescale are substantially smaller than the measurement interval $(t_1, t_2)$.

The inventors have discovered that the ideal model appears accurate when flows report single packets, e.g., with zero inactive timeout, or with sFlow. Then, the first packet timestamp reported in the flow can be used to locate a reported packet within the measurement interval. However, use of non-zero timeouts generally prevents exactly locating sampled packets with a precise timestamp. This is manifested in two ways.

The first is referred to as "Information Aggregation." Since only the time of first and last sampled packet are reported, if a flow reporting more than two sampled packets intersects with the measurement interval but is not completely contained within it, it cannot be determined with certainty how many of the flow's packets were sampled during the measurement interval.

Figure 2:
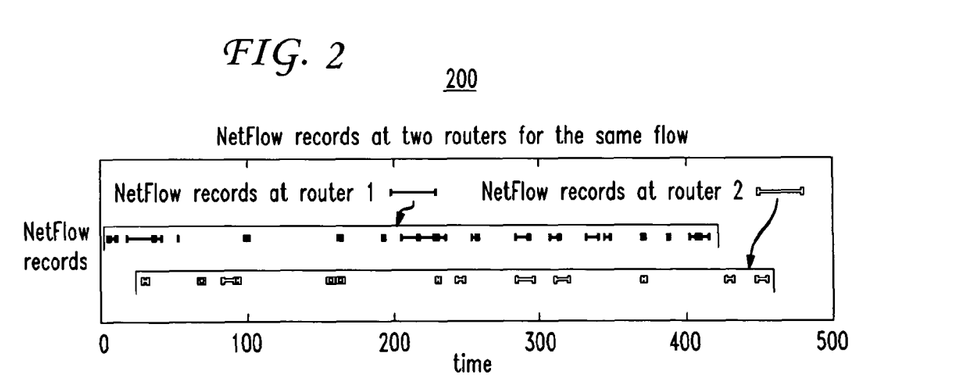
FIG. 2 is a graph of NetFlow records at two routers for the same flow, showing the flow records unaligned in time.

The second is referred to "Nonalignment of Flow Records." At a given router, a single underlying set of packets with a common key can lead to the generation of multiple NetFlow records and the flow start time and flow end time recorded in these records are decided by packet sampling as well as active timeout, inactive timeout and flow cache full events. Since each router generates NetFlow records independently, these events will happen at different times for the same flow at different routers. As a result, NetFlow records generated by the same flow at two different routers may not align themselves in time. FIG. 2, a graph 200 of NetFlow records at two routers for the same flow, showing the NetFlow records unaligned in time. These unaligned NetFlow records further decrease the ability to attribute sampled packets to a measurement interval. For example, a given packet may be reported in a flow record from $R_1$ that lies entirely within the measurement interval $(t_1, t_2)$, but the same packet may be reported in a flow record from $R_2$ that does not lie entirely within the interval $(t_1, t_2)$.

The principal effect of sampling is to increase the variance of the estimate (1) as the sampling rate decreases (i.e., fewer packets are sampled during a given measurement interval).

It is assumed that the transmission time of the packets from $R_1$ to $R_2$ and the time gaps between the two routers have a negligible impact on the estimation result and are hereafter ignored. This assumption requires propagation times to be very small compared with the measurement interval. Additionally, any offset between the clocks at the two routers must be similarly small.

Loss measurement has been described in terms of loss experienced between two routers. In practice, however, traffic may follow multiple paths due to equal cost routing or load balancing. Loss can be attributed to a path if complete routing information per packet is available, including routing information and knowledge of load balancing algorithms. For example, if load balancing is done on a per-flow rather than per-packet basis, complete knowledge would enable the mapping of a flow's key to the path it follows. However, in practice network state changes and interface transitions may make the mapping time dependent.

In accordance with aspects of the invention, three loss estimation methodologies are presented by the sampled flow paradigm: a "SYN/FIN based method" that uses protocol information reported in flows to make it equivalent to using single packet flows, a "fitted flows based method," and a "weighted flows based method." The latter two employ flows that only partially overlap the measurement interval $(t_1, t_2)$.

The SYN/FIN based method uses the SYN or SYNACK flags that are set in the first packets of a TCP session. If a SYN is sampled, it can be assumed that the flow start time in the NetFlow record is the arrival time of the SYN packet. Similarly, since a FIN packet declares the end of a TCP session, it can be assumed that the flow end time in the NetFlow record is the arrival time of the FIN packet. As a result, if the SYN or FIN packet is sampled by NetFlow, its arrival time is known from the flow start time or flow end time reported in the NetFlow record. If this time is within the measurement time interval $(t_1, t_2)$, then the SYN/FIN packet is included in the packet count $X_i$ for the router i that generated the record. This effectively reduces the analysis to the ideal case, and Eqn. (1) can be used to estimate the packet loss rate.

The fitted flows based method extends the SYN/FIN method to a larger set of packets. All NetFlow records generated at both routers for all the flows are inspected. For a flow F, let $R_F^1$ be the set of NetFlow records generated by F at router $R_1$ and $R_F^2$ be those generated at router $R_2$. A flow can be called fitted if for all NetFlow records $R \in R_F^1 \cup R_F^2$, the starting time $t_e$ and end time $t_e$ recorded in R either fall strictly within the measurement interval $t_1 < t_s < t_e < t_2$, or fall completely outside the interval $t_s < t_e < t_1$ or $t_2 < t_s < t_e$. For these fitted flows, an unbiased estimator can be obtained of the total number of packets from these flows arriving at the two routers within the measurement interval $(t_1, t_2)$. In this method, the number of SYN and FIN packets recorded during the measurement interval are also added to those from the unfitted flows. The packet counts $X_1$ and $X_2$ are then calculated as the sum of the SYN/FIN packets and the total packets reported in those NetFlow records for fitted flows in which the NetFlow record fall entirely within the measurement interval $(t_1, t_2)$. These packet counts are correlated to the measurement interval are then employed in Eqn. (1) to estimate the loss rate.

The weighted flows based method takes part of the sampled packets in proportion to the duration overlapped with the measurement interval $(t_1, t_2)$. The reason NetFlow records are not used for 'unfitted' flows is that when flow start time $t_s$ and flow end time $t_e$ do not fall in the measurement duration $(t_1, t_2)$, they contain both packets arriving during the measurement interval and packets arriving before or after the measurement interval. This aggregation makes it difficult to determine the number of packets that actually arrive during the measurement interval. However, if the rate of sampled packets within the flow is relatively smooth, the NetFlow records can be utilized by taking part of the sampled packets in proportion to the duration overlapped with the measurement interval. The smoothness assumption is reasonable when connection round trip times that govern burstiness, are far smaller than the flow duration. The smoothness assumption appears reasonable for common parameters such as when less than one packet will be sampled from each TCP flight, and there will typically be no bursts of sampled packets.

Let $t_R^s$ denote the flow start time recorded in NetFlow record R and $t_R^e$ denote the flow end time. The duration of the NetFlow record $d_R = t_R^e - t_R^s$. And let the duration of the overlap of $(t_R^s, t_R^e)$ and $(t_1, t_2)$ be $o_R$, then in this method $$X_1 = \sum_{R \in R_1} \frac{o_R}{d_R} n_R, \quad X_2 = \sum_{R \in R_2} \frac{o_R}{d_R} n_R$$

where $R_i$ is the NetFlow records generated at router $R_i$ and $n_R$ is the number of packets reported in NetFlow record R. The variables $X_1$ and $X_2$ are then applied to Eqn. (1) for estimating the loss rate as described above.

As described in the foregoing, $\hat{p}$ is a consistent estimator of the loss rate p, i.e., it converges to the true value p. The speed of convergence of the numerator and denominator of (1) can be determined using the Central Limit Theorem, and the Delta-method as presented by M. Schervish, *Theory of Sta-* *tistics*, New York, Springer, 1995. This enables the approximation of the variance of $\hat{p}$ as the number of underlying packets n becomes large. Specifically, the Delta method approximates the variance of $$\hat{p} = f(X_1, X_2) := 1 - \frac{X_2}{X_1} \text{ as } \operatorname{Var}(\hat{p}) \approx \nabla f \cdot C \nabla f$$

where $\nabla f$ is the vector of partial derivatives of f evaluated at the expected values $E[X_i]$, and C is the covariance matrix of $(X_1, X_2)$. $X_1$ and $X_2$ are independent and as a result $$\operatorname{Var}(\hat{p}) \approx \frac{1}{ns}(2(1-p)^2(1-s) + p(1-p)) \quad (2)$$

For small loss and sampling rates s and p, $$\operatorname{Var}(\hat{p}) \approx \frac{2}{(ns)}.$$

This is independent of the underlying loss rate p.

A determination of how many underlying packets n are required in order to reach a desired accuracy is made under different sampling rates. A fundamental requirement is the ability to discern the loss rate, in the sense that statistical fluctuations of its estimator must not be so large that the estimated loss rate will often be zero. An analytic way to express this is to require that the standard deviation (SD) of the estimated loss be smaller than the actual loss rate, i.e., $\sqrt{\operatorname{Var}(\hat{p})} \leq p$.

Figure 3:
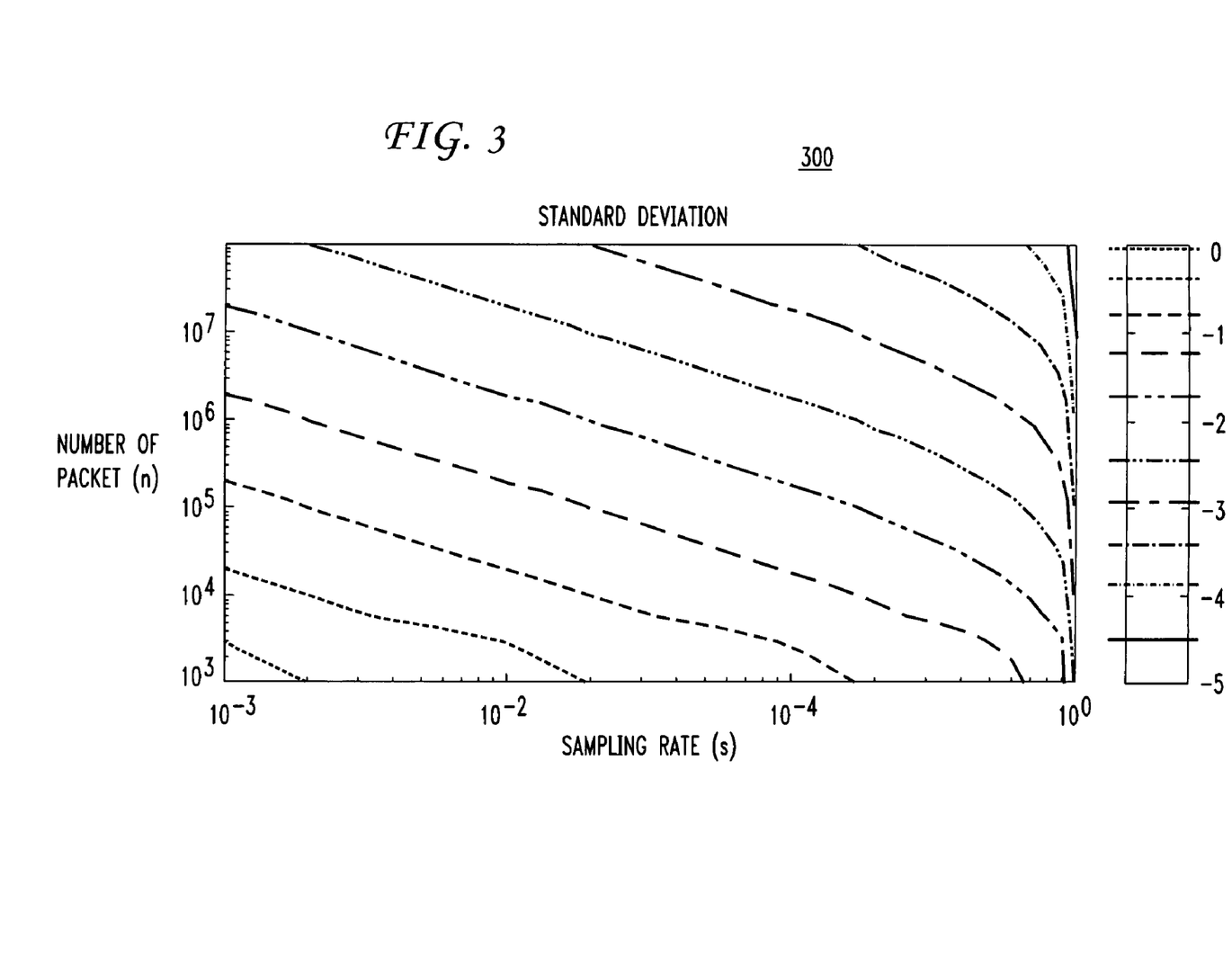
FIG. 3 is a graph of the standard deviation under different sampling rate and sample size conditions.

FIG. 3 is a graph 300 that depicts the standard deviation under different sampling rate and sample size conditions, and demonstrates the log of the SD that can be achieved with n packets under a sampling rate of s when the packet loss rate is p=0.01. Each curve in FIG. 3 represents a level of SD and it indicates the number of packets n required to achieve that SD for a given packet sampling rate. For example, when the packet sampling rate is s=1/500, FIG. 3 indicates that in order to have a SD that is less than p=0.01, n should be at least in the order of $10^7$; this can also be seen from the above approximation. Assuming a measurement at one minute intervals and the average packet size of about 600 bytes, this requires a data rate of the order of 1 Gb/s; high speed backbone links commonly carry such traffic rates or higher.

Another way to view this performance is to compare with active measurement of the same loss. Consider n packets subject to independent loss at rate p, with X packets surviving. The resulting estimate of p is $\tilde{p}=1-X/n$ with variance $\operatorname{Var}(\tilde{p})=p(1-p)/n \approx p/n$ for small loss rate p. Thus for a given number of packets traversing the network, $$\frac{\operatorname{Var}(\tilde{p})}{\operatorname{Var}(\hat{p})} = sp/2.$$

In the example s=1/500, p=0.01, this ratio is $10^5$, i.e, active measurement needs a factor $10^5$ fewer packets to achieve the same accuracy. Thus, collecting $10^7/10^5=10^2$ packets in the same time frame of 1 minute requires a probing rate of 100/60≈2 probe packets per second.

The conclusions of this calculation are likely to change with network developments. Assuming that measurement infrastructure capacity keeps up with data rates, then presumably s will not change. Thus for a given measurement period there will be more packets traversing the network and hence estimator variance decreases, or equivalent, lower loss rates can be measured. However, if the measurement infrastructure capacity remains fixed and it is assumed that in any measurement window the product ns characterizes the number of measurements taken and must remain roughly the same order of magnitude as the network grows. In this case no improvement in estimation accuracy will be possible.

The performance of the estimation techniques is a function of a number of factors: measurement interval, active and inactive timeout regime, sampling rate and underlying loss rate. To understand the impact of the different dimensions, a comparison of the estimator for the same traffic for a range of different parameter settings is presented utilizing the following trace-based simulation driven evaluation methodology.

Ten real world traces from different vantage points collected over several years were studied. Similar result trends were observed for all these traces, and in the interest of brevity, only the results for three typical traces collected between 2002 and 2006 are presented. The traces were observed at different geographic locations and covering links that ranged from a GigEth link to an OC-192 link: (i) Two traces from the Abilene network available in the NLANR Special Traces Archive (see "NLANR PMA: Special Traces Archive," http://pma.nlanr.net/Special/); (ii) A trace collected on the path between a large data center and the backbone of a Tier-1 ISP.

Figure 4A:
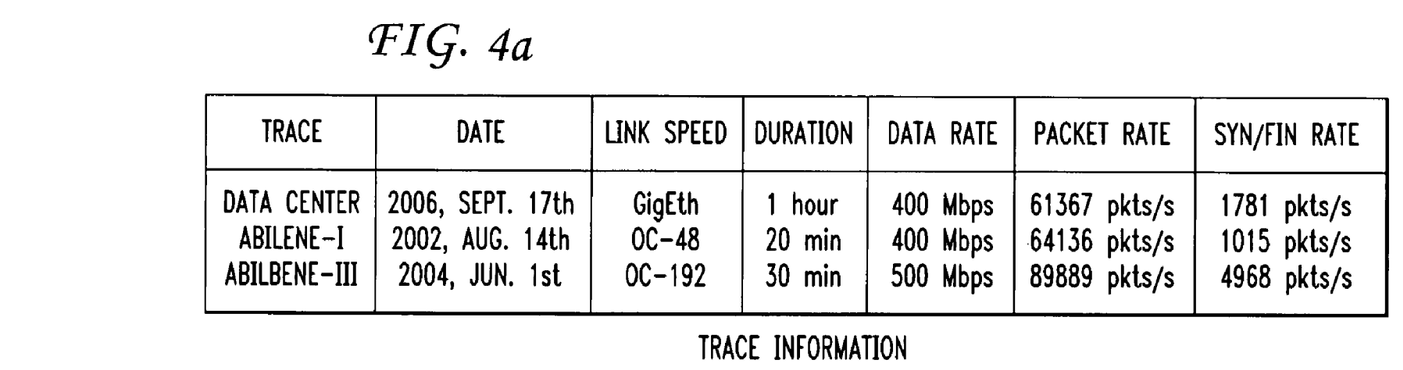
FIG. 4a is a table summarizing information for three traces collected from different vantage points, and FIG. 4b summarizes settings used for evaluating the estimation techniques disclosed herein.

FIG. 4a is a table summarizing trace information for the above described trace characteristics.

For each trace, a Bernoulli loss process was applied with a packet loss rate of 0.001, 0.005, 0.01, 0.05 and 0.10, respectively, over the whole trace and another 5 traces are generated. The trace without loss serves as the input traffic to the first router, and the trace with loss serves as the input traffic to the second router on the network path being measured.

A NetFlow simulator was developed to generate packet sampled NetFlow records. The sampling rate was set to 1 (no sampling), 1/50 and 1/500 packets, respectively. The simulator also considered different active and inactive timeout thresholds. Three (active, inactive timeout) combinations were utilized: T1: (60 s, 15 s), T2: (1800 s (30 min), 60 s) and T3: (300 s (5 min), 30 s). These represent: short, long and medium-sized timeout regimes and the values are based on those sometimes used in real networks.

Figure 4B:
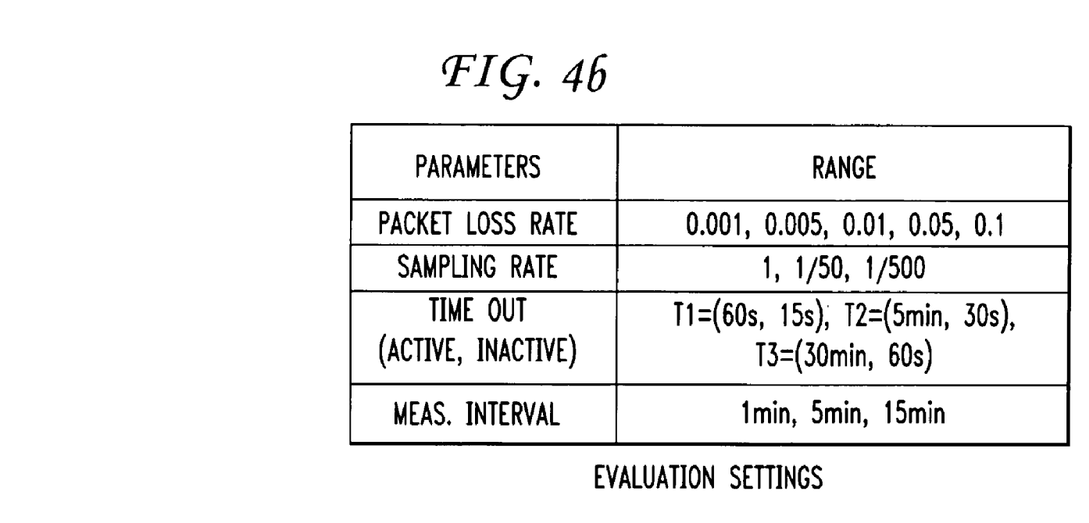

The estimation techniques were evaluated for measurement intervals of 1 min, 5 min and 15 min respectively. FIG. 4b summarizes the evaluation settings used in the above described evaluations.

The SYN/FIN based method utilizes only a small fraction of the traffic. The fitted flows and weighted flows based methods include the SYN/FIN packets in the traffic and therefore demonstrate consistently better performance than the SYN/FIN method. Presented in the following section are only those results from the fitted flows method and the weighted flows method.

Figure 5:
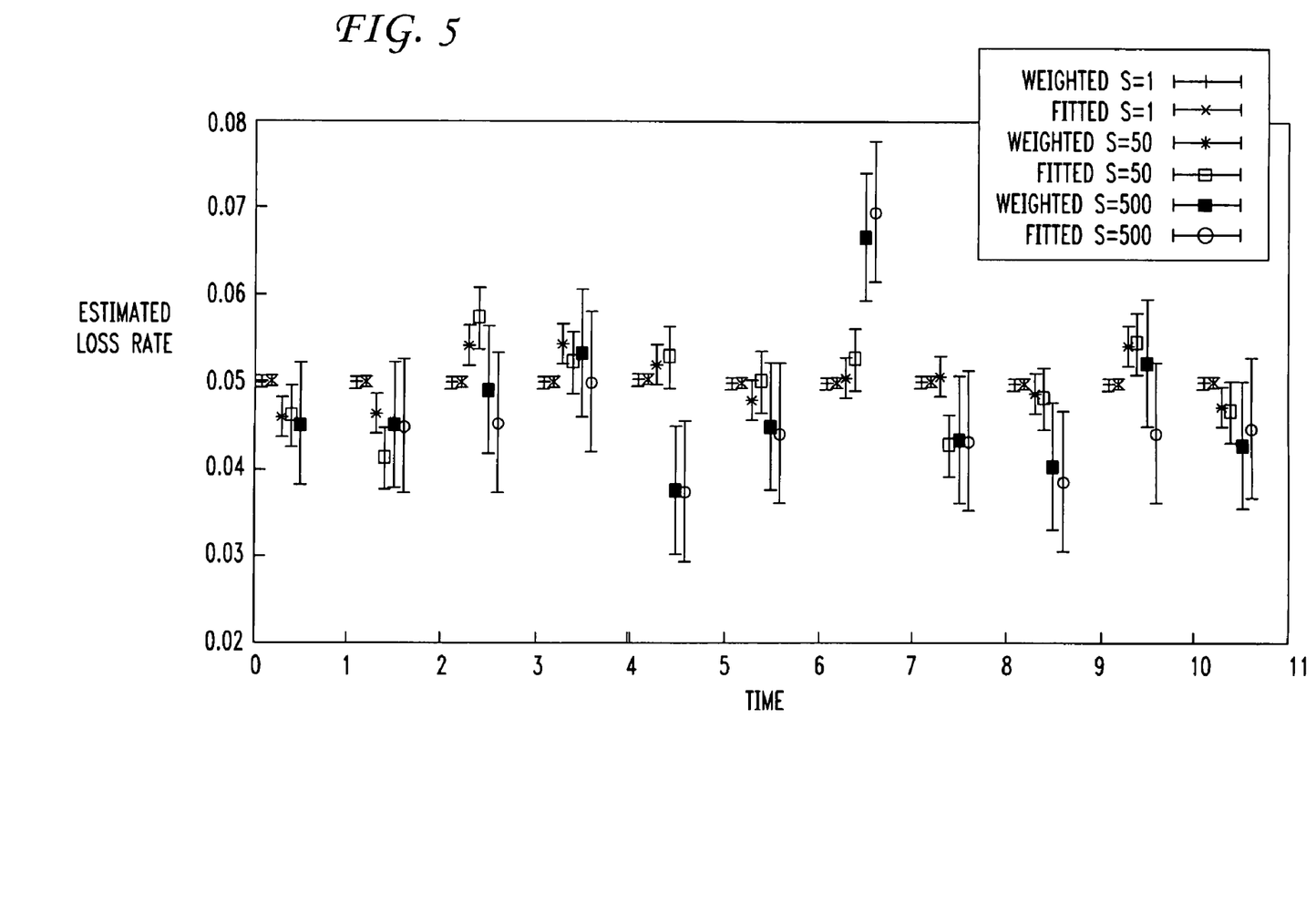
FIG. 5 is a depiction of a time series of the packet loss rate using timeout scheme T1 and measurement interval of five minutes for a loss rate of 5% estimated using the various techniques disclosed herein.

A time series of the packet loss rate estimated by the algorithms under different sampling rates in FIG. 5 for the Data Center trace are presented, using timeout scheme T1 and measurement interval of 5 minutes for a loss rate of 5%. The accuracy of the algorithms is presented across multiple settings along with a study of the impact on the accuracy from several perspectives.

Figure 6A:
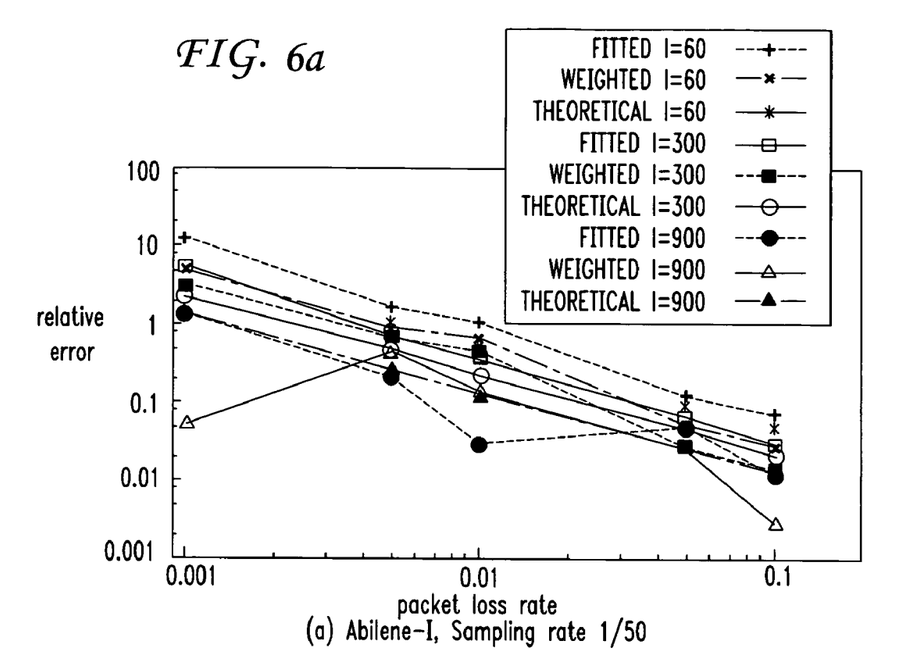
FIG. 6a is a presentation of the relative error obtained under different measurement settings using timeout scheme T1 at a sampling rate of 1/50.
Figure 6B:
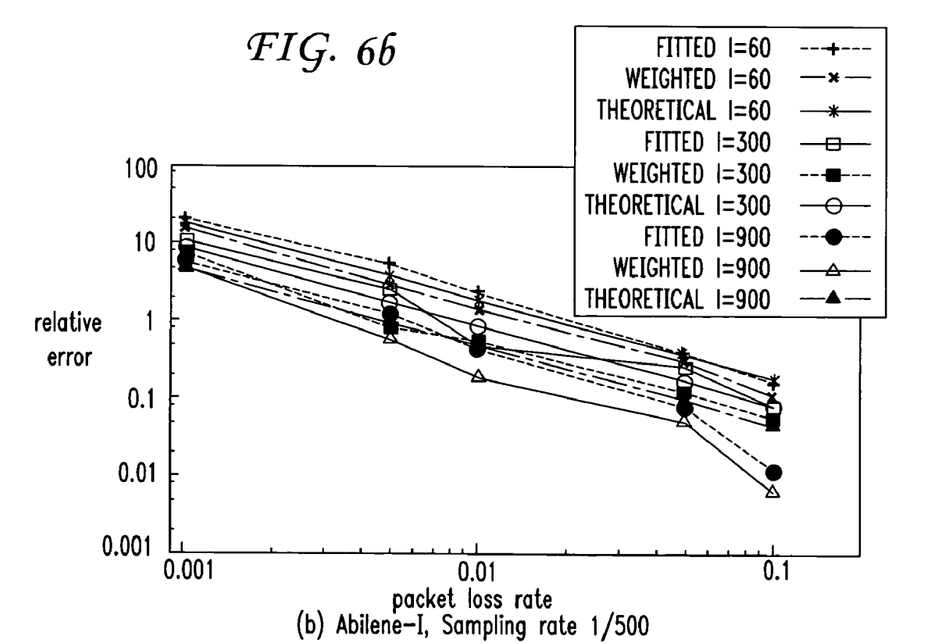
FIG. 6b depicts the same information using a sampling rate of 1/500.

In order to study the accuracy of the methods, for each setting, the mean relative error over the whole trace was calculated. FIG. 6a and FIG. 6b depict the relative error obtained under different measurement settings for the three traces. These results were obtained using timeout scheme T1. The average number of packets that appeared in each trace for a particular measurement interval was also counted and used that to calculate the theoretical relative error values according to the variance obtained from Eqn. (2).

As shown in FIGS. 6a and 6b, the estimators in accordance with the present invention provide a similar accuracy as predicted by the theory. For the traces evaluated: 1) With sampling rate 1/50, as shown in FIG. 6a, the methods can detect packet loss rate of 0.005 over a 5 minute interval with a relative error of about 0.5 or an absolute error of 0.0025; 2) Under a sampling rate of 1/500, as shown in FIG. 6b, if the packet loss rate is low, i.e. <0.005, the estimators would generally give an estimate of less than 0.02 for the 5 minute and 15 minute measurement interval; 3) if the packet loss rate is high, i.e. 0.05, it can be detected within a 10 percent relative error in a 15 minute interval or even 5 percent relative error for the high date rate Abilene-III case; 4) the weighted flows based method generally provides a better estimation than the fitted flows based method since it utilizes more data from the NetFlow records; and 5) under the current data rates provided in these traces, a 1 minute measurement interval does not provide enough data packets for a reliable NetFlow records based estimation. This is limited by the amount of data evaluated in the 1 minute interval.

From Eqn. (2), estimator variance increases as the sampling rate decreases. Thus if the sampling rate decreases by a factor $\alpha$, the standard deviation increases by a factor $\sqrt{\alpha}$. Similarly, if the measurement interval is increased by a factor $\alpha$, so does the amount of data (assuming the same rate) and the standard deviation decreases by a factor $\sqrt{\alpha}$. FIGS. 6a and 6b depict this behavior in the experiments. For example, as shown in FIG. 6b for the Data Center trace, when the underlying packet loss rate is 0.01, the weighted-flows based method gives a relative error of 0.7290 under the sampling rate of 1/500 and a measurement interval of 5 minutes. When the measurement interval increases to 15 minutes, the relative error becomes 0.3539 as shown in FIG. 6b, and when the sampling rate increases to 1/50, the relative error becomes 0.2363 as shown in FIG. 6a, both matching expectations.

Figure 7A:
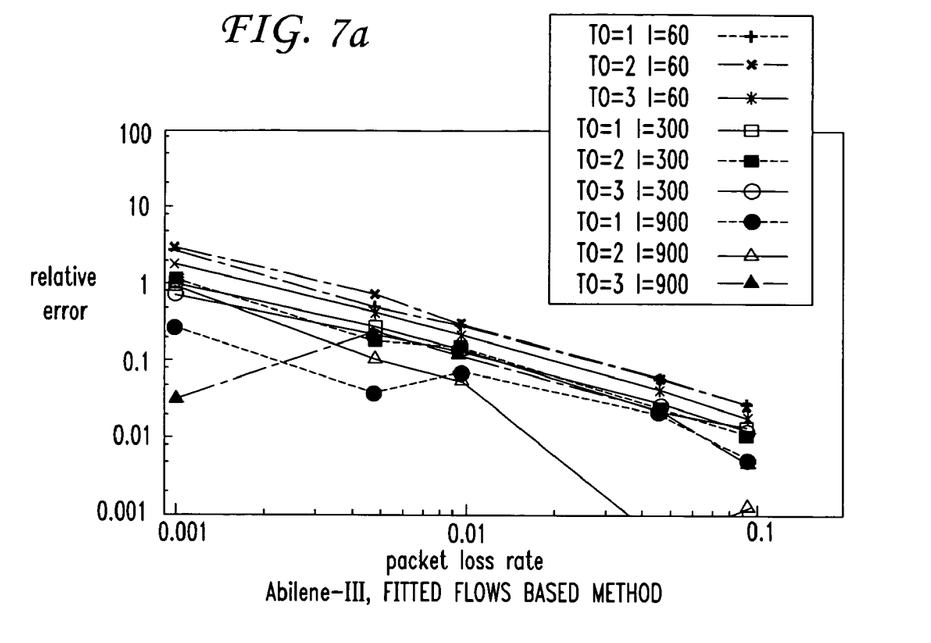
FIG. 7a is a presentation of the relative error of estimations for a trace under different combinations of timeout schemes and measurement intervals utilizing a fitted-flows based method.
Figure 7B:
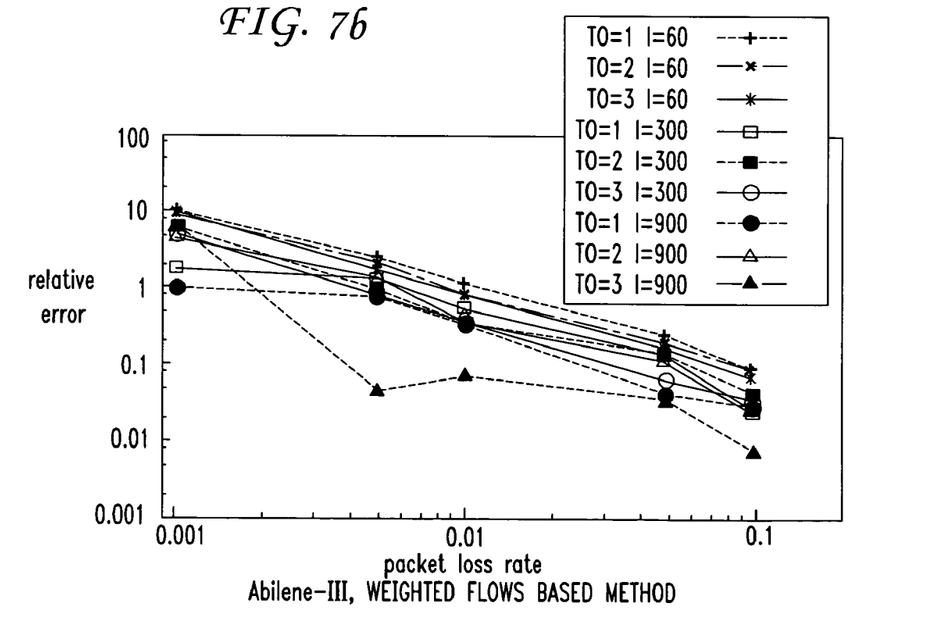
FIG. 7b depicts the same information utilizing a weighted flows based method in accordance with aspects of the invention.

FIGS. 7a and 7b depict the relative error of estimations for the Abilene-III trace under different combinations of timeout schemes and measurement intervals. The results from the fitted-flows based method are shown in FIG. 7a and those from the weighted flows based method are shown in FIG. 7b. The choice of timeout schemes does not have a significant impact on accuracy, since it appears that most packets occur in flows of short duration.

Figure 8:
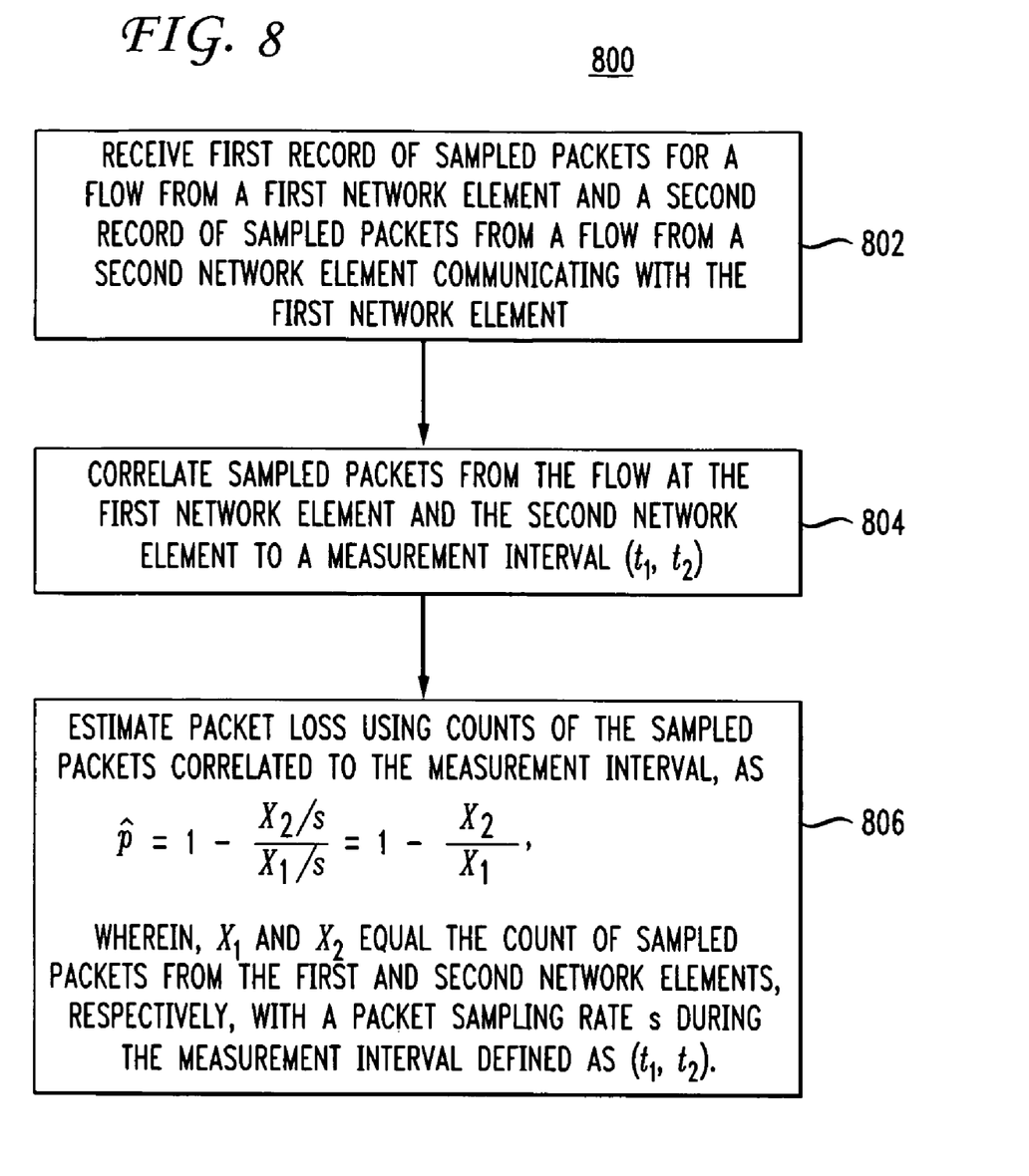
FIG. 8 is a flow diagram of an exemplary method in accordance with an aspect of the present invention.

FIG. 8 is a flow diagram of an exemplary method 800 in accordance with an aspect of the present invention. In step 802, a device receives a first record of sampled packets for a flow from a first network element and a second record of sampled packets for the flow from a second network element communicating with the first network element. Note, although there are 2 devices described, this method can be implemented using i devices and i corresponding records. In step 804, sampled packets from the flow at the first network element and the second network element are correlated to a measurement interval $(t_1, t_2)$. In step 806, packet loss is estimated by using a count of the sampled packets correlated to the measurement interval, as $$\hat{p} = 1 - \frac{X_2/s}{X_1/s} = 1 - \frac{X_2}{X_1},$$

wherein, $X_1$ and $X_2$ equal the count of sampled packets from the first and second network elements, respectively, with a packet sampling rate s during the measurement interval defined as $(t_1, t_2)$. Step 804 is implemented using the three methodologies described above.

The present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 9:
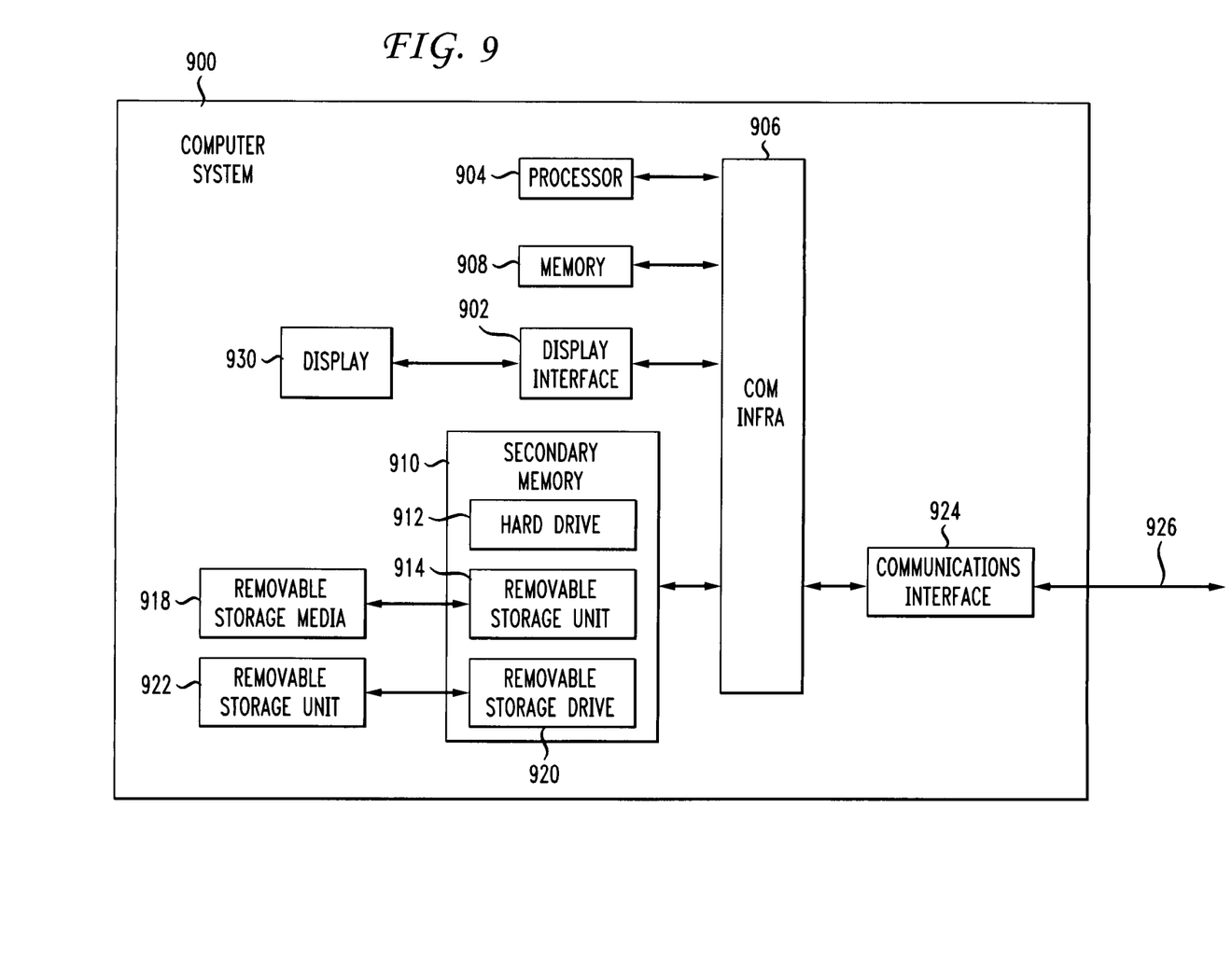
FIG. 9 is a schematic of an illustrative computer device for implementing the present invention.

In one embodiment, the invention is directed toward one or more computer systems capable of carrying out the functionality described herein. An example of such a computer system 900 is shown in FIG. 9. Computer system 900 includes one or more processors, such as processor 904. Processor 904 is connected to a communication infrastructure 906 (e.g., a communications bus, cross-over bar, or network). Computer system 900 can include a display interface 902 (e.g. a graphics card) that allows graphics, text, and other data from the communication infrastructure 906 (or from a frame buffer not shown) to be displayed on a display unit 930. Computer system 900 also includes a main memory 908, preferably random access memory (RAM), and may also include a secondary memory 910. The secondary memory 910 may include, for example, a hard disk drive 912 and/or a removable storage drive 914. The removable storage drive 914 has read/write functionality onto removable storage media 918 having stored therein computer software and/or data. In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900. Computer system 900 may also include a communications interface 924 allowing software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals (not shown), which may be electronic, electromagnetic, optical or other signals capable of being received by communications interface 924. These signals are provided to communications interface 924 via a communications path (e.g., channel) 926. This path 926 carries the signals and may be implemented using wire or cable, fiber optics, a telephone line, a cellular link, a radio frequency (RF) link and/or other communications channels. Computer programs (also referred to as computer control logic) are stored in main memory 908 and/or secondary memory 910. Computer programs may also be received via communications interface 924. Computer programs, when executed, enable the computer system 900 to perform the features of the present invention, as discussed herein. Accordingly, such computer programs represent controllers of the computer system 900. In an embodiment where the invention is implemented using software, the software may be stored in a computer program product and loaded into computer system 900 using removable storage drive 914, hard drive 912, or communications interface 924. The control logic (software), when executed by the processor 904, causes the processor 904 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s). In one exemplary embodiment, the system for the present invention may be implemented, for example, as a Microsoft.net® desktop application program (Microsoft.net® is made by Microsoft® Corporation of Redmond, Wash.), which may reside on a computer hard drive, database or other repository of data, or be uploaded from the Internet or other network (e.g., from a PC, minicomputer, mainframe computer, microcomputer, telephone device, PDA, or other NAD having a processor and input and/or output capability). Any available software tool capable of implementing the concepts described herein may be used to implement the system and method of the present invention. The method and system of the present invention may also be implemented as an application-specific add-on to a program, or as a standalone application.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for estimating one-way packet loss in a packet network, the method comprising:
    receiving a first record of sampled packets for a flow from a first network element;
    receiving a second record of sampled packets for the flow from a second network element in communication with the first network element;
    determining, for a measurement interval, a first count of the sampled packets in the first record received from the first network element and a second count of the sampled packets in the second record received from the second network element, the first and second counts to account for the sampled packets in the first and second records having been determined by sampling a fraction of packets in a packet stream for the flow; and
    estimating the packet loss using the first and second counts of the sampled packets for the measurement interval.

2. The method of claim 1, wherein the estimated packet loss is represented by:

$$\hat{p} = 1 - \frac{X_2/s}{X_1/s} = 1 - \frac{X_2}{X_1},$$

wherein, $X_1$ and $X_2$ equal the first and second counts of the sampled packets from the first and second network elements, respectively, with a packet sampling rate s during the measurement interval defined as $(t_1, t_2)$.

3. The method of claim 1, wherein estimating the packet loss comprises:
   determining a ratio of the second count of the sampled packets from the second network element to the first count of the sampled packets from the first network element; and
   subtracting the ratio from a value of one to determine an estimated packet loss for the flow between the first and second network elements.

4. The method of claim 1, wherein the flow corresponds to a transmission control protocol session, and the method further comprises:
   including a transmission control protocol SYN packet from the first record in the first count if the first record includes a flow start time within the measurement interval, but otherwise not including the transmission control protocol SYN packet from the first record in the first count;
   including a transmission control protocol FIN packet from the first record in the first count if the first record includes a flow end time within the measurement interval, but otherwise not including the transmission control protocol FIN packet from the first record in the first count;
   including a transmission control protocol SYN packet from the second record in the second count if the second record includes a flow start time within the measurement interval, but otherwise not including the transmission control protocol SYN packet from the second record in the second count; and
   including a transmission control protocol FIN packet from the second record in the second count if the second record includes a flow end time within the measurement interval, but otherwise not including the transmission control protocol FIN packet from the second record in the second count.

5. The method of claim 1, wherein the first record is part of a first set of records of sampled packets for the flow from the first network element, the second record is part of a second set of records of sampled packets for the flow from the second network element, and the method further comprises:
   determining a first group of the first set of records and a second group of the second set of records that lie entirely within the measurement interval; and
   determining the first and second counts of the sampled packets to be respective sums of the sample packets reported in the first and second groups of records that lie entirely within the measurement interval, the first and second counts to also include sampled SYN packets and FIN packets falling within the measurement interval but not included in the first and second groups of records.

6. The method of claim 1, wherein the first record is part of a first set of records of sampled packets for the flow from the first network element, the second record is part of a second set of records of sampled packets for the flow from the second network element, and the method further comprises:
   determining the first count of the sampled packets from the first network element to be a sum of weighted numbers of sampled packets from records in the first set of records; and
   determining the second count of the sampled packets from the second network element to be a sum of weighted numbers of sampled packets from records in the second set of records.

7. The method of claim 6, wherein a weighted number of sampled packets from a particular record in the first or second sets of records is determined by scaling the number of sampled packets from the particular record by a ratio of a first value to a second value, the first value corresponding to an overlap between a duration of the sampled packets in the particular record and the measurement interval, the second value corresponding to the duration of the sampled packets in the particular record.

8. A method for estimating one-way packet loss in a packet network, the method comprising:
   receiving a first record of sampled packets for a flow from a first network element;
   receiving a second record of sampled packets for the flow from a second network element communicating with the first network element;
   associating sampled packets from the flow at the first and second network elements with a measurement interval; and
   estimating packet loss using a count of the sampled packets associated with the measurement interval, wherein the estimated packet loss is represented by:

$$\hat{p} = 1 - \frac{X_2/s}{X_1/s} = 1 - \frac{X_2}{X_1},$$

wherein, $X_1$ and $X_2$ equal the count of sampled packets from the first and second network elements, respectively, with a packet sampling rate s during the measurement interval defined as $(t_1, t_2)$, and wherein associating sampled packets from the flow with the measurement interval $(t_1, t_2)$ comprises:
setting the flow start time in each record to the arrival time of a SYN packet;
setting the flow end time in each record to the arrival time of a FIN packet;
if the flow start time is within the measurement interval $(t_1, t_2)$, then attributing the SYN packet to the packet count for the network element that generated the record; and
if the flow end time is within the measurement interval $(t_1, t_2)$, then attributing the FIN packet to the packet count for the network element that generated the record.

9. A method for estimating one-way packet loss in a packet network, the method comprising:
   receiving a first record of sampled packets for a flow from a first network element;
   receiving a second record of sampled packets for the flow from a second network element communicating with the first network element;
   associating sampled packets from the flow at the first and second network elements with a measurement interval; and
   estimating packet loss using a count of the sampled packets associated with the measurement interval, wherein the estimated packet loss is represented by:

$$\hat{p} = 1 - \frac{X_2/s}{X_1/s} = 1 - \frac{X_2}{X_1}$$

wherein, $X_1$ and $X_2$ equal the count of sampled packets from the first and second network elements, respectively, with a packet sampling rate s during the measurement interval defined as $(t_1, t_2)$, and wherein associating sampled packets from the flow with the measurement interval $(t_1, t_2)$ comprises:

for the flow (F), setting $R_F^1$ as a set of records generated by the flow F at the first network element $R_1$ and $R_F^2$ as a set of records generated by the flow F at the second network element $R_2$;

for all flow records $R \in R_F^1 \cup R_F^2$, where the starting time $t_s$ and end time $t_e$ recorded in R either fall within the measurement interval $t_1 < t_s < t_e < t_2$, or outside the interval $t_s < t_e < t_1$ or $t_2 < t_s < t_e$;

calculating the sampled packet counts $X_1$ and $X_2$ as the sum of SYN packets, FIN packets and a total number of packets reported in the flow records which fall entirely within the measurement interval $(t_1, t_2)$.

10. A method for estimating one-way packet loss in a packet network, the method comprising:

receiving a first record of sampled packets for a flow from a first network element;

receiving a second record of sampled packets for the flow from a second network element communicating with the first network element;

associating sampled packets from the flow at the first and second network elements with a measurement interval; and estimating packet loss using a count of the sampled packets associated with the measurement interval, wherein the estimated packet loss is represented by:

$$\hat{p} = 1 - \frac{X_2/s}{X_1/s} = 1 - \frac{X_2}{X_1}$$

wherein, $X_1$ and $X_2$ equal the count of sampled packets from the first and second network elements, respectively, with a packet sampling rate s during the measurement interval defined as $(t_1, t_2)$, and wherein associating sampled packets from the flow with the measurement interval $(t_1, t_2)$ comprises:

denoting $t_R^s$ as the flow start time recorded in a record R and $t_R^e$ as the flow end time recorded in a record R;

setting the duration of the record $d_R = t_R^e - t_R^s$, and the duration of overlap of $(t_R^s, t_R^e)$ and the measurement interval $(t_1, t_2) = o_R$, then:

$$X_1 = \sum_{R \in R_1} \frac{o_R}{d_R} n_R, \ X_2 = \sum_{R \in R_2} \frac{o_R}{d_R} n_R$$

where $R_1$ is the record generated at the first network element, $R_2$ is the record generated at the second network element, and $n_R$ is the number of packets reported in record R.

11. A machine-readable medium containing computer encoded instructions which, when executed by a processor, cause a device to at least:

receive a first record of sampled packets for a flow from a first network element;

receive a second record of sampled packets for the flow from a second network element in communication with the first network element;

determine, for a measurement interval, a first count of the sampled packets in the first record received from the first network element and a second count of the sampled packets in the second record received from the second network element, the first and second counts to account for the sampled packets in the first and second records having been determined by sampling a fraction of packets in a packet stream for the flow; and estimate packet loss using the first and second counts of the sampled packets for the measurement interval.

12. The machine-readable medium of claim 11, wherein the estimated packet loss is represented by:

$$\hat{p} = 1 - \frac{X_2/s}{X_1/s} = 1 - \frac{X_2}{X_1}$$

wherein, $X_1$ and $X_2$ equal the first and second counts of the sampled packets from the first and second network elements, respectively, with a packet sampling rate s during the measurement interval defined as $(t_1, t_2)$.

13. The machine-readable medium of claim 11, wherein the computer encoded instructions, when executed by the processor, further cause the device to:

determine a ratio of the second count of the sampled packets from the second network element to the first count of the sampled packets from the first network element; and subtract the ratio from a value of one to determine an estimated packet loss for the flow between the first and second network elements.

14. The machine-readable medium of claim 11, wherein the computer encoded instructions, when executed by the processor, further cause the device to:

include a transmission control protocol SYN packet from the first record in the first count if the first record includes a flow start time within the measurement interval, but otherwise not include the transmission control protocol SYN packet from the first record in the first count;

include a transmission control protocol FIN packet from the first record in the first count if the first record includes a flow end time within the measurement interval, but otherwise not include the transmission control protocol FIN packet from the first record in the first count;

include a transmission control protocol SYN packet from the second record in the second count if the second record includes a flow start time within the measurement interval, but otherwise not include the transmission control protocol SYN packet from the second record in the second count; and include a transmission control protocol FIN packet from the second record in the second count if the second record includes a flow end time within the measurement interval, but otherwise not include the transmission control protocol FIN packet from the second record in the second count.

15. The machine-readable medium of claim 11, wherein the first record is part of a first set of records of sampled packets for the flow from the first network element, the second record is part of a second set of records of sampled packets for the flow from the second network element, and the computer encoded instructions, when executed by the processor, further cause the device to:

determine a first group of the first set of records and a second group of the second set of records that lie entirely within the measurement interval; and determine the first and second counts of the sampled packets to be respective sums of the sample packets reported in the first and second groups of records that lie entirely within the measurement interval, the first and second counts to also include sampled SYN packets and FIN packets falling within the measurement interval but not included in the first and second groups of records.

16. The machine-readable medium of claim 11, wherein the first record is part of a first set of records of sampled packets for the flow from the first network element, the second record is part of a second set of records of sampled packets for the flow from the second network element, and the computer encoded instructions, when executed by the processor, further cause the device to:
   determine the first count of the sampled packets from the first network element to be a sum of weighted numbers of sampled packets from records in the first set of records; and
   determine the second count of the sampled packets from the second network element to be a sum of weighted numbers of sampled packets from records in the second set of records.

17. The machine-readable medium of claim 16, wherein a weighted number of sampled packets from a particular record in the first or second sets of records is determined by scaling the number of sampled packets from the particular record by a ratio of a first value to a second value, the first value corresponding to an overlap between a duration of the sampled packets in the particular record and the measurement interval, the second value corresponding to the duration of the sampled packets in the particular record.

18. A machine-readable medium containing computer encoded instructions which, when executed by a processor, enable a device to estimate one-way packet loss in a packet network by at least:
   receiving a first record of sampled packets for a flow from a first network element;
   receiving a second record of sampled packets for the flow from a second network element communicating with the first network element;
   associating sampled packets from the flow at the first and second network elements with a measurement interval; and
   estimating packet loss using a count of the sampled packets associated with the measurement interval, wherein the estimated packet loss is represented by:

$$\hat{p} = 1 - \frac{X_2/s}{X_1/s} = 1 - \frac{X_2}{X_1}$$

wherein, $X_1$ and $X_2$ equal the count of sampled packets from the first and second network elements, respectively, with a packet sampling rate s during the measurement interval defined as $(t_1, t_2)$, and wherein associating sampled packets from the flow with the measurement interval $(t_1, t_2)$ comprises:
   setting the flow start time in each record to the arrival time of a SYN packet;
   setting the flow end time in each record to the arrival time of a FIN packet;
   if the flow start time is within the measurement interval $(t_1, t_2)$, then attributing the SYN packet to the packet count for the network element that generated the record; and
   if the flow end time is within the measurement interval $(t_1, t_2)$, then attributing the FIN packet to the packet count for the network element that generated the record.

19. A machine-readable medium containing computer encoded instructions which, when executed by a processor, enable a device to estimate one-way packet loss in a packet network by at least:
   receiving a first record of sampled packets for a flow from a first network element;
   receiving a second record of sampled packets for the flow from a second network element communicating with the first network element;
   associating sampled packets from the flow at the first and second network elements with a measurement interval; and
   estimating packet loss using a count of the sampled packets associated with the measurement interval, wherein the estimated packet loss is represented by:

$$\hat{p} = 1 - \frac{X_2/s}{X_1/s} = 1 - \frac{X_2}{X_1}$$

wherein, $X_1$ and $X_2$ equal the count of sampled packets from the first and second network elements, respectively, with a packet sampling rate s during the measurement interval defined as $(t_1, t_2)$, and wherein associating sampled packets from the flow with the measurement interval $(t_1, t_2)$ comprises:
   for the flow (F), setting $R_F^1$ as a set of records generated by the flow F at the first network element $R_1$ and $R_F^2$ as a set of records generated by the flow F at the second network element $R_2$;
   for all flow records $R \in R_F^1 \cup R_F^2$, where the starting time $t_s$ and end time $t_e$ recorded in R either fall within the measurement interval $t_1 < t_s < t_e < t_2$, or outside the interval $t_s < t_e < t_1$ or $t_2 < t_s < t_e$;
   calculating the sampled packet counts $X_1$ and $X_2$ as the sum of SYN packets, FIN packets and a total number of packets reported in the flow records which fall entirely within the measurement interval $(t_1, t_2)$.

20. A machine-readable medium containing computer encoded instructions which, when executed by a processor, enable a device to estimate one-way packet loss in a packet network by at least:
   receiving a first record of sampled packets for a flow from a first network element;
   receiving a second record of sampled packets for the flow from a second network element communicating with the first network element;
   associating sampled packets from the flow at the first and second network elements with a measurement interval; and
   estimating packet loss using a count of the sampled packets associated with the measurement interval, wherein the estimated packet loss is represented by:

$$\hat{p} = 1 - \frac{X_2/s}{X_1/s} = 1 - \frac{X_2}{X_1}$$

wherein, $X_1$ and $X_2$ equal the count of sampled packets from the first and second network elements, respectively, with a packet sampling rate s during the measurement interval defined as $(t_1, t_2)$, and wherein associating sampled packets from the flow with the measurement interval $(t_1, t_2)$ comprises:
   denoting $t_R^s$ as the flow start time recorded in a record R and $t_R^e$ as the flow end time recorded in a record R;
   setting the duration of the record $d_R = t_R^e - t_R^s$, and the duration of overlap of $(t_R^s, t_R^e)$ and the measurement interval $(t_1, t_2) = o_R$, then:

$$X_1 = \sum_{R \in R_1} \frac{o_R}{d_R} n_R, \quad X_2 = \sum_{R \in R_2} \frac{o_R}{d_R} n_R$$

where $R_1$ is the record generated at the first network element, $R_2$ is the record generated at the second network element, and $n_R$ is the number of packets reported in record R.

* * * * *